May 12, 1970     A. D. EHRENFRIED ET AL     3,511,090
FLUENT MATERIAL LEVEL SENSOR
Filed June 25, 1968
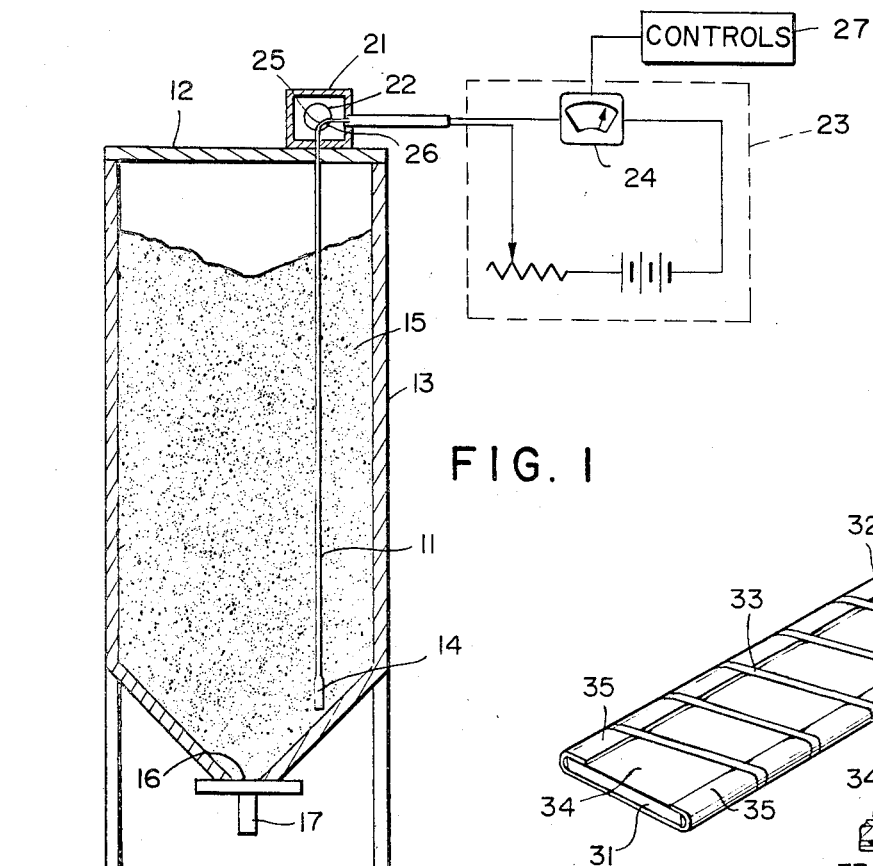
FIG. 1
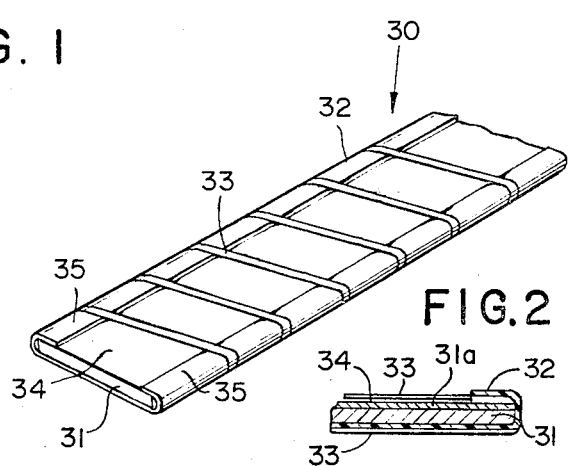
FIG. 2
FIG. 2A
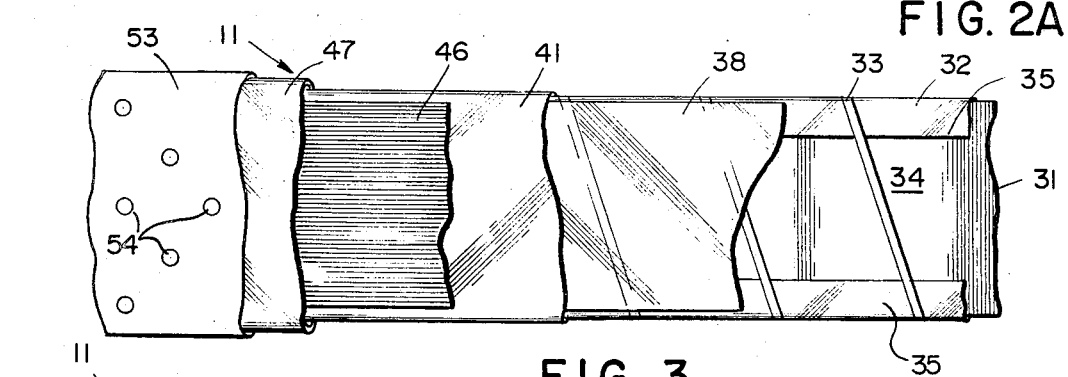
FIG. 3
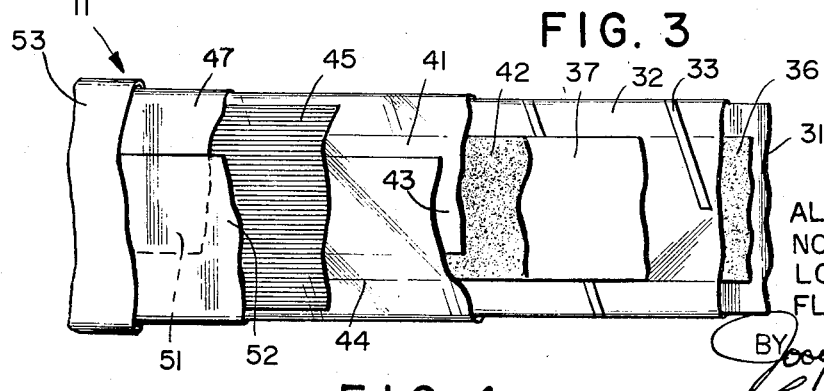
FIG. 4
INVENTORS
ALBERT D. EHRENFRIED
NORTON T. PIERCE
LOUIS MAGER
FLOYD E. HALSTEAD
BY Joseph Weingarten
Lawrence A. Mayhew
ATTORNEYS

United States Patent Office 3,511,090
Patented May 12, 1970

3,511,090
FLUENT MATERIAL LEVEL SENSOR
Albert D. Ehrenfried and Norton T. Pierce, Concord,
Louis Mager, Sudbury, and Floyd E. Halstead, Maynard, Mass., assignors to Metritape, Inc., West Concord, Mass., a corporation of Massachusetts
Filed June 25, 1968, Ser. No. 739,868
Int. Cl. G01f 23/18
U.S. Cl. 73—301
21 Claims

ABSTRACT OF THE DISCLOSURE

A sensor for providing substantially continuous measurement of the level of fluent materials such as grain powder etc. The sensor is a variable resistance element normally spaced from and wound around an elongated conductive plate and protected by a composite jacket. The sensor is positioned vertically within a tank or bin so that the fluent material presses the resistance element against the conductive plate. The level is measured by measuring the resistance of the sensor.

FIELD OF THE INVENTION

This invention relates to measuring apparatus and more particularly concerns an improved sensor for the continuous measurement of the levels of liquids, slurries and dry granular or powdered materials while extending applicability to situations involving extremely wide ranges of environmental conditions.

DISCUSSION OF THE PRIOR ART

Present level measuring devices employ a variety of means for detecting and indicating the level of fluent material. These devices include mechanical float systems which rise and fall with liquid level, external mercury columns dependent upon internal pressure, electrical systems in which a signal is generated and reflected from the surface of the material and a number of different types of sensors which provide indications only when the material reaches specific discrete levels. Many of these devices are not suitable for the measurement of solid particulate materials, nor do they provide reliable, unsupervised, continuous indications of the level of any type of material. Most of the present sensing elements are capable of measuring variables from a single point location only. Level sensors which have been designed to provide continuous level indications have not been universally adaptable for measurement of fluent particulate solids as well as liquids and have not been suitable for operation in environmental extremes of temperature, pressure and corrosiveness.

One type of sensor which provides excellent continuous level indications under some conditions is disclosed in Pierce et al., U.S. Letters Patent No. 3,153,342, of which the present invention is an improvement. This earlier level sensor embodies the principle of an elongated resistance transducer employing a conductive base strip with a precision resistance wire helically wound around it and normally separated therefrom by an insulative element. This prior invention uses a single element jacket for converting pressure to force to cause contact between the base strip and the resistance wire. Although the earlier device is an extremely accurate and useful level sensor, it has certain operational limitations, some of which are related to length and sensitivity and its use under extremes of ambient conditions such as temperature, corrosiveness and downward frictional forces acting upon the jacket. In some dry particulate solids the downward forces acting upon the sensor jacket are so large as to cause the tubular jacket of Pierce et al. to stretch and corrugate at the bottom, similar to a "sagging stocking." Consequences of this result are spurious responses, reduction of sensitivity and even destruction of the sensor itself. Thus the length of such sensors for use in dry materials is limited. Another consequence of sensor operation submerged in dry materials is the resulting abrasion of the sensor jacket caused by relative movement of the material with respect to the sensor. Further, limitations on the moisture-vapor transmission characteristics of the extruded tubular jacket of the prior sensor left the inner electrical system somewhat vulnerable to chemical attack, especially in highly corrosive environments.

It is evident from the foregoing that the continuous measurement of fluent material levels presents a variety of difficulties relatively unique to the particular situation involved. It is, however, the principal object of this invention to provide a sensor which is an improvement upon the Pierce et al. sensor in that it is more precise and reliable in situations where the prior sensor was useful and is additionally universally applicable to measure the level of fluent materials having widely varying characteristics over considerable ranges of temperature and pressure environments.

SUMMARY OF THE INVENTION

Broadly speaking, the invention herein disclosed resides in an elongated level sensor having very small cross section adapted to be disposed in some suitable manner, such as vertically, throughout the depth of the material being monitored. The inner electrical system, in sensors constructed according to this invention includes a high tensile strength electrically conductive base strip, which typically, is partially surrounded by an insulative material which exposes a portion of the length of one side of the base strip to contact by a precision resistance wire of suitable cross section distributively wound around the insulated base strip. This inner electrical system is closely surrounded by a flexible multi-element jacket of high tensile strength which is, at the same time, very sensitive to surrounding pressure. The jacket is secured to the inner electrical system throughout its length and serves to enclose and protect the inner electrical system while acting as an efficient pressure sensitive diaphragm for pressing the resistance wire against the base strip. The sensor is a pressure transducer of universal application which exhibits an effective internal resistance proportional to the level of the material in the container. The moisture-vapor transmission of the jacket is very low and it retains its mechanical properties of high tensile strength, rupture and abrasion resistance and integrity of form even when subjected to temperature extremes. Although sensor jackets of this invention may have all the above enumerated characteristics, certain of these characteristics may be enhanced or reduced for specific applications by the addition or deletion of certain of the jacket elements, or by the substitution of an element of different material in order to successfully combat an extraordinary ambient condition.

This sensor may be termed a distributed transducer because it is sensitive to pressure throughout the active portion of its length. It is not restricted, as are many prior devices, to the measurement of variables only from a single point location. The surface of the stored material moving up and down causes the sensor output to vary in a highly precise manner, which may be linear or non-linear as desired. Appropriate instruments, which may be remotely located from the sensor may provide high-resolution indications of material level, a permanent record of level variations caused by material inflow and outflow or high and low level control signals, or all of these together. With this sensor it is now possible to know on an up-to-the-minute basis the quantity of highly valuable materials held in containers such as tanks, silos, transportation vehicles and wells. By means of this sensor and associated equipment, inventory conditions of widely scattered storage facilities are brought to a central station to enable storage facilities to be used with greater efficiency and to provide substantially improved reorder or refill scheduling. Because the level readings may be provided at locations remote from the material container, the hazard and labor costs of men climbing tall tanks to periodically measure levels with plumb lines is thus eliminated.

The sensor is usually suspended through a small access hole in the top of the container. Installation can often be performed while the vessel is in use, and there is no need to breach the integrity of the container walls or the respective lining materials. When it is suspended, this sensor is allowed to move with the flow of material without in any way interfering with the flow of even hard-to-move solids. For particular applications, both the top and bottom may be secured to the container, and the sensor may be disposed at any desired angle within the container; if need be it may be supported in an appropriate rigid channel.

The sensor of this invention has a speed of response which is sufficient to permit dynamic level variations to be measured and recorded. It has been used successfully for charting ocean waves from a moving ship to determine sea state as well as providing instantaneous draft readings.

A particularly significant safety feature of this sensor is that because it is purely resistive and only its resistance value is being measured, the magnitude of the electrical energy associated therewith can be well below those required to ignite highly explosive vapors. This feature is significant also in that it allows the sensor to be used for measuring the level of highly volatile fluids without danger of fire or explosion caused by an electrical spark.

BRIEF DESCRIPTION OF THE DRAWING

The features and advantages of the invention will become apparent from the following detailed description when read in conjunction with the accompanying drawing in which:

FIG. 1 is a diagrammatic view in an operational environment of a level measuring system employing a sensor constructed according to the principles of this invention;

FIG. 2 is a perspective view of the inner electrical system of the level sensor of this invention;

FIG. 2A is a partial end view of an alternative embodiment of the inner electrical system shown in FIG. 2;

FIG. 3 is a top view of a completed sensor having the various jacket layers broken away to facilitate their description; and FIG. 4 is a view of the opposite side of the completed sensor shown in FIG. 3.

DESCRIPTION OF THE PREFERRED EMBODIMENTS

With reference now to the drawing and more particularly to FIG. 1, thereof, there is shown a complete level measuring system for sensing, indicating and controlling the level of fluent materials. Level sensor 11 extends downwardly through cover 12 of container 13 and is shown with a suitable weight 14 at its lower end which helps stabilize its generally vertical orientation despite some lateral movement of dry fluent material 15. Where necessary, the lower end of the sensor may be fastened to the tank. It should also be understood that the sensor need not be vertical but will operate properly as long as it extends in some manner between the top and the bottom of the container. Container 13 may be filled through an access port (not shown) at the top and is emptied from the bottom through hole 16 by means of control valve mechanism 17. The upper end of sensing element 11 terminates inside, and is anchored to, protective box 21 which is in turn secured to cover 12. An expansible chamber 22, in the form of a flexible plastic bag, for example, is attached to the top of the sensor. Chamber 22 contains chemicals for protection of the sensor from moisture and corrosion and its interior communicates with the interior of the sensor to provide a complete isolation of the inner electrical system from the external environment. In addition to protecting the sensor, chamber 22 maintains the internal sensor pressure the same as the ambient pressure, allowing the sensor to operate as well in partial vacuums as under several atmospheres of pressure.

Electrical circuit 23 including indicator 24 is connected to sensor 11 by means of lead wires 25 and 26. Control means 27 is responsive to the output of circuit 23 and may be used to control the amount of material supplied to and removed from container 13 in order to maintain a predetermined range of levels therein. Operation of this electrical circuit is described in detail in Pat. No. 3,153,342 and need not be further discussed herein. Indicator 24 may, if desired, be a meter relay and controls 27 may be any suitable type of valve control arrangement connected to container 13 by means not shown.

As the level of the material 15 in container 13 rises and falls, the effective resistance which sensor 11 presents to electrical circuit 23 varies in a predetermined precise manner therewith so that indicator 24 provides readings related to the level of material 15 at any given instant. A recorder or digital printer may be utilized within circuit 23 to provide a permanent record of material level as a function of time.

INNER ELECTRICAL SYSTEM

The construction of a preferred embodiment of a level sensor of this invention is illustrated in FIGS. 2, 3 and 4. The details of a typical inner electrical system which can be made in any desired length for level sensor embodiments constructed in accordance with the principles of this invention, are shown in FIG. 2, with a slight modification shown in FIG. 2A. Inner electrical system 30, which is enclosed by the multi-element jacket shown in FIGS. 3 and 4, comprises electrically conductive base strip 31 partially covered throughout its length by electrically insulative film 32 around which is wound resistance ribbon 33. This resistance ribbon is also herein termed a "winding." This arrangement exposes a portion 34 of the entire length of the front side of base strip 31 to contact by segments of each turn of resistance ribbon 33. Edge flaps 35 of film insulation 32 may exhibit a spring-like quality when wrapped around the edges of base strip 31. The thickness of film insulation 32, the spring action of its edge flaps and a predetermined precise tension preload on resistance ribbon 33 maintains the winding in normally spaced relationship from exposed portion 34 of base strip 31. Insulation 32 may thus provide a spring action either by a bending effect of its edge flaps or by its compressibility or both. Resistance ribbon 33 is adapted to make electrical contact with base strip 31 whenever a predetermined external pressure is applied to the sensor to cause the winding to flex inwardly to touch exposed portion 34.

Base strip 31 is typically made of high tensile strength spring steel which may be coiled for shipment and storage. The strength of the base strip enables it to withstand extremely high tension forces and resist linear deformation and rupture even when the sensor is subjected to the frictional forces of dense dry particulate solids. A layer of precious metal such as silver, gold or platinum is normally applied to exposed portion 34 to enhance its electrical contact with winding 33. Such layer may be applied by any suitable method such as electroplating.

Resistance winding 33, as shown in the drawing, is a thin metallic ribbon having a rectangular cross section and is wound about the base strip with any desired pitch. The drawing shows a uniform pitch for winding 33 but it may be logarithmic or otherwise non-linear if desired. The pressure of the sensor jacket is efficiently received by ribbon 33 due to the relatively large surface area of the ribbon which is contacted by the jacket. This cross sectional configuration also provides the resistance winding with two reasonably sharp edges for making positive electrical contact along a geometrical line with surface 34 of base strip 31 resulting in relatively high contact pressure together with very low contact resistance for overall enhanced electrical contact properties. As the head of fluent material at a certain point on the sensor increases, winding 33 is progressively pressed into firmer contacting relationship with base strip 31 resulting in a slight wiping or contact cleaning action which further improves the electrical connection therebetween.

The resistivity of winding 33 is substantially constant and its temperature coefficient of resistance is very low. It is immediately evident that these characteristics, together with a uniform turn-to-turn spacing, provide the sensor with a highly precise electrical system which it maintains over a substantial temperature range. An example of a resistance ribbon having the desired qualities is a nickel-copper alloy sold by Driver-Harris Company under the trade name "Advance." This product has an excellent temperature coefficient of resistance of 0.00002 ohm per ohm per degree centigrade. Insulation element 32 is preferably formed of a material characterized by extremely small permanent dimensional change and with time under load, even when subjected to elevated temperatures and relatively high applied pressure. It thus maintains its mechanical properties over the wide range of temperatures to which sensor 11 may be subjected. It is also desired that the strength, physical shape and dynamic action of insulation element 32 remain substantially constant in widely ranging temperature environments. Materials which exhibit these qualities include thermosetting plastics, specific examples of which are polyesters such as that sold by Du Pont under the trademark Mylar and polyimides such as that sold by Du Pont under the trade name Kapton.

When winding 33 is wound about film 32 and base strip 31 with uniform applied tension or preload, the slight stiffness, uniform thickness of film 32 and the slight but continuous tendency of the edges 35 to open outward combine to form a highly precise long-lived electrical structure wherein the sensitivity of the completed sensor is constant throughout its length. That is, the head of fluent material required to flex the winding into contact with the base strip at any point along the length of the sensor is substantially constant.

Film 32 is secured to base strip 31 by a flexible adhesive means which essentially prevents relative motion between the two elements but does not appreciably stiffen the sensor. A satisfactory adhesive means for this purpose is tape 36, shown in FIG. 4, which is a plastic film base with adhesive on both sides. Film 32, which has a very low coefficient of friction, is thereby prevented from creeping longitudinally and becoming laterally disoriented with coiling and continued flexing motion of the sensor in use. Tape 36 is applied to the "back" of the sensor. The side of the sensor adjacent exposed portion 34 will hereinafter be termed the "front" of the sensor.

After resistance ribbon 33 is precisely wound around the base strip, its tension and spacing is maintained by means of tape 37 having an adhesive thereon which secures the winding to the back side of film 32. Tape 37 is similar to tape 36 except that only one side is adherent.

The thus constructed inner electrical system may be made in long sections and cut to size as needed. It is readily apparent from the foregoing that the relative positions of the inner electrical system elements and the tension on the winding remains constant, even as it is cut into various lengths for use as the cores for completed sensors.

An alternative construction of the inner electrical system is depicted by FIG. 2A. Instead of coating the base strip with a precious metal, a laminar structure may be used. For example, FIG. 2A shows a base strip 31 made of unplated spring steel with an overlayer 31a. Plating of the steel base strip with a precious metal has a tendency to produce a phenomenon known in the art as "hydrogen embrittlement" which seriously reduces the desired base strip characteristics of flexural and tensile strength. Thin strip 31a comprising, for example, a rolled gold-nickel laminate may be used to provide an efficient contacting surface 34. With this construction, base strip 31 is not subjected to any potentially weakening process and the inner electrical system exhibits all of the characteristics previously described with respect to the unlaminated construction. Strips 31 and 31a are ideally not bonded together over their lengths, but are allowed to move longitudinally relative to one another to maintain sensor flexibility to permit it to be coiled without deformation. These strips 31 and 31a are, however, preferably bonded at one point, for example, the upper end of the sensor.

SENSOR JACKET

The jacket of sensor 11 performs several significant functions, two of which may be termed primary and are of equal importance. The first is that the jacket acts as a protective covering for the inner electrical system and as such is made substantially impervious to the environment to which it is subjected. Secondly, it is a highly resilient diaphragm which effectively converts the external pressure of the surrounding fluent material to a lateral force which causes the jacket in that region to flex inwardly, thus inducing mechanical and electrical contact between the base strip and its surrounding winding. It has a comparatively high tensile strength which significantly increases the overall longitudinal strength of the sensor, this strength being measured in hundreds of pounds, while offering such a slight resistance to lateral deflection that the sensitivity of the sensor is measured in hundredths of pounds. It is adhered along its full length at the back of the sensor to impart the strength of the central structure to it and thus prevent sagging or corrugating due to the extreme downward forces imparted by some fluent materials. Its external surface may have a low coefficent of friction to enable the sensor to operate in dry solids which tend to adhere or compact without being subjected to destructive downward frictional forces; and which also serves to prevent residual build-up of sticky materials on the sensor surface. It may also be made highly resistant to the abrasion of dry solids, or to the corrosive effects of certain chemicals or both. Each sensor jacket possesses the above qualities, but because the jacket is a composite structure which fits the requirements of each particular application, any one or more of those qualities may be significantly enhanced or reduced as desired. Thus the sensor constructed according to the teachings herein is not only a universally applicable level measurement device but it enjoys a physical and application flexibility heretofore unknown in level sensors.

Although the following description sets forth the details of the jacket shown in the drawing, it is to be understood that this is merely a preferred embodiment having wide applicability, and that various alternative embodiments are included within the principles of this invention.

The front of inner electrical system 30 is substantially covered by facing 38 as shown in FIG. 3. The facing is electrically insulative, mechanically hard and abrasion resistant, has a high tensile strength and is secured to the sensor only at the respective ends thereof. Facing 38 is preferably slightly stiff so as to efficiently transmit the lateral motion of the surrounding jacket to the electrical winding. In essence, facing 38 integrates the forces generated by pressure on the surrounding jacket surfaces and delivers the resultant force as a contact pressure of the winding on the base conducting material. It can be seen that the rectangular cross-section of the resistance wire is of utility here in providing a relatively broad area surface of metal for engagement by the facing. Further, it is to be noted that the facing serves to prevent the inward flexing of the jacket into the spaces between adjacent winding turns. The facing also serves to prevent spurious buckling of the outer jacket surface, and thus results in a more uniform electrical output with changes in material level. A particularly useful function of facing 38 is that it aids in the distribution of the point load forces of dry pelletized materials, thus maintaining the accuracy of the sensor and preventing such a point load from permanently damaging the precision resistance ribbon. For certain applications, operation of the sensor and facing 38 can be significantly enhanced by the imparting of a controlled amount of tension in the facing at the time of assembly. This causes the facing to function as though it were of greater thickness, without measurably increasing total jacket stiffness. When sensor 11 is coiled for storage and shipment, the tension on facing 38 is partially relieved since the front of the sensor is normally placed on the inside of the coil. However, the facing remains flat and parallel to the sensor front and does not buckle or move relative to the inner electrical system. It thus acts as a protective interleaving between the winding and the outer jacket which may become slightly uneven as the sensor is coiled.

Facing 38, which is somewhat stiff, is slightly narrower than the inner electrical system and therefore lies flat over the resistance winding. By preventing the edges of the facing from bending around the edges of the inner system, the facing performs its functions without materially stiffening the sensor and without adversely affecting its sensitivity.

The inner electrical system is protected from possible adverse chemical effects emanating from the surrounding fluent material by means of barrier layer 41 which is wrapped around the inner system and sealed at the back. This layer is substantially impervious to the material being measured. Layer 41 is made of a soft and compliant material which, although it completely surrounds and seals the electrical system, does not appreciably stiffen the jacket structure. Several materials have been found to be suitable for use as barrier layer 41, some of which are polyethylene, polypropylene, polyvinylidene (sold by Dow Chemical Co. under the trade name Saran) and polytetrafluoroethylene (sold by Du Pont under the trademark Teflon).

Barrier layer 41 has inner and outer flaps 43 and 44 respectively, which are sealed in any convenient manner to the back of the sensor. FIG. 4 shows these flaps independently sealed to the sensor by means of tape 42 which has pressure sensitive adhesive on both sides, similar to tape 36 previously discussed. This method of sealing has certain advantages in that it provides the required seal and results in seams having an extended path for potentially destructive leakage of moisture, vapor or gas. Certain liquids are so corrosive that the protective capabilities of barrier layer 41 must be fortified. In such instances additional layers of impervious material are applied to the sensor in a manner similar to layer 41 shown in the drawing. Each successive layer is overlapped in the same direction and adhered to the back of the sensor, thereby creating labyrinth structure providing a potential leakage path of maximum length from the exterior to the interior of the sensor through the seams at the back.

The primary strength members of the sensor jacket are reinforcing strips 45 and 46 which provide comparatively enormous longitudinal strength to the jacket structure. These tensile strength members permit the sensor jacket to withstand the extremely large downward frictional forces of some of the materials which must be measured. Reinforcing strip 46 is adhered directly to the front of barrier layer 41 and strip 45 is adhered over the overlapping flaps of layer 41 at the back of the sensor. They may be secured by any suitable adhesive means but it is preferred that one side of each strength member be provided with a pressure sensitive adhesive so that they may be secured efficiently without additional materials being necessary. The strength of these strips is also partially imparted to the base strip through the intermediately adhered layers.

It has been found that a plastic such as Mylar with longitudinally continuous glass fibers imbedded therein is quite satisfactory for strength members 45 and 46. The use of longitudinal fibers provides the longitudinal strength desired without substantially affecting the flexural sensitivity of the sensor face. It is generally desired that reinforcing strips 45 and 46 do not wrap around the edges of the sensor since they are heavier than most of the other jacket layers and would substantially stiffen the jacket.

The final element of the integral sensor jacket is outer skin 47. It is flexible and yet has a hard outer surface so that solid particulate materials do not readily become imbedded therein. It has a low coefficient of friction, and is highly resistant to abrasion. It has a non-stick release outer surface which prevents sticky and hard-drying materials from building up and forming a rigid film on the sensor surface, and protects the sensor during processing, transit and installation. Outer skin 47 reduces the downward frictional forces of the surrounding fluent material to a minimum and at the same time has substantial tensile strength of its own to contribute to the sensor while being impervious to most materials.

The inner surface of outer skin 47 is coated with pressure sensitive adhesive to distributively secure it to the inner structure and thereby support the entire outer skin relative thereto. Outer flap 52 is adhered directly to inner flap 51 to complete the seal. It should be noted that these flaps are sealed in the same direction as the flaps of barrier layer 41 to thereby enhance the labyrinthian structure of the jacket as a further protection against possible chemical attack. It is to be understood that other methods, which may use continuous or multiple point adhesives, would be satisfactory for securing the outer skin to the sensor. Among the materials found to be satisfactory for the outer skin are Mylar polyester, Kapton polyimide, polypropylene, polyurethane, polytetrafluoroethylene and polyethylene.

Another protective layer in the form of loose fitting sheath 53 is shown in the drawing. This is not part of the composite sensor jacket but is an additional protective element which may be used where extremely corrosive or abrasive conditions prevail. It is relatively thick, and is made of flexible, low moisture-vapor transmission plastic such as polytetrafluoroethylene which is extruded in tubular form or is shaped into a tube by means of fused side seams. This outer sheath is removable and may be replaced as it becomes etched or abraded by the material in which it is immersed. Thus the life of the sensor itself may be as long under extreme conditions as under ideal conditions, through the use of outer protective sheath 53.

At the top of the sensor, means (not specifically shown) are provided for physical support of the sensor on the container, for electrical connections to base strip 31 and winding 33 and for attachment of the flexible breathing bag 22 which communicates with the interior of the sensor jacket. The bottom termination may, if desired, include a weight 14 to help hold the sensor in a substantially vertical orientation.

The particular embodiment set forth in detail above is but one example of a sensor constructed in accordance with the principles disclosed herein. Ambient temperatures in which the sensor may satisfactorily operate, are dependent upon the capabilities of the materials used in its construction and embrace a wide range. For example, Kapton and Teflon films have service temperature ranges between $-200°$ F. and $+500°$ F. with the silicone adhesives used having a similar temperature range capability Glass materials may be used for jacketing and insulation purposes and even metallic materials may be employed in the jacket because of its imperviousness and electrical shielding characteristics. These modifications offer potential improvement in temperature, strength and vapor permeation capabilities of the sensor. The cross section of this sensor is very small; the base strip may be of the order of ¾ inch wide and have a thickness ranging from 0.020 to 0.050 inch. Film insulation 32 may have a thickness range from 0.001 to 0.004 inch. The relative dimensions of the remaining components are illustrated by the drawing. Thus, a hole in the top of a container less than two inches in diameter would suffice for the installation of this sensor.

Associated indicating and controlling equipment is calibrated to account for the "actuation depth," the head of material required for electrical contact with the sensor. The actuation depth is fixed and substantially constant for each material being measured, being of the order of six inches for water.

Depending upon the surface configuration of the monitored materials, the sensor is placed in the container so that it gives the most accurate representation of the level of the material. For example, dry materials tend to have uneven upper surfaces, so that if the sensor is placed at a location between the container wall and central axis, the surface irregularities will tend to average out. Furthermore, the sensor may reside at any desired angle according to the geometry of the container.

Alternative embodiments may be made for specific sensor applications. The composite jacket may differ materially from that described and still possess the necessary characteristics of strength, imperviousness, long life, smoothness, good temperature characteristics and proper dynamic diaphragm action. Modifications from the described embodiment may be made to improve the characteristics of strength for dry materials, moisture impermeability for liquids, abrasion resistance for solids, corrosion resistance for chemicals, cleanliness for food and drug products, and enhance accuracy for hydrological uses. Tensile strengths may be greater than one ton while transverse sensitivity to pressure variations may be as small as 0.01 p.s.i.

Examples of modifications to the jacket structure are many. Facing strip 38 is not necessary under all conditions and may be omitted where its special functions are not required or desired. As previously mentioned, barrier layer 41 may be a composite of several layers of the same or different materials, depending upon the intensity and the number of destructive effects it is intended to protect against. For relatively short sensors (up to thirty feet) or for applications requiring a sensor having the maximum possible sensitivity, the tensile strength reinforcing strips may be omitted entirely. For intermediate lengths (thirty to sixty feet) where downward friction forces tend to be high, only strength element 45 is included. This substantially enhances the longitudinal strength of the jacket without adversely affecting the sensitivity of the sensor. For longer sensors (greater than sixty feet) where there are large downward frictional forces, both tensile strength elements 45, 46 are included as part of the jacket structure. Even outer skin 47 may be provided with different or additional properties if the circumstances warrant. One composition of outer skin 47 which is useful in many situations includes a continuous aluminized surface which is capable of conducting away static charge and of acting as an electrostatic shield for the inner electrical system. This element could be formed of an outer Mylar polyester surface, an aluminized inner coating and a final inner coating of pressure sensitive adhesive. An alternative construction would be comprised of two layers, a clear pressure sensitive Mylar over an aluminized pressure sensitive Mylar. Where a metallized surface is included, the metal is normally connected to the upper sensor termination to provide a ground path to carry away static electric charge.

In situations where the monitored container is mobile, as is true of truck and railroad tanks and ships, the sensor may be subject to substantial motion within the container and may make frequent contact with the container sides or with obstructions within the container itself. Under such conditions, and when the sensor is being handled and shipped, it is desirable to provide it with added physical protection. Accordingly, loose fitting sheath 53, which is described above as a flexible, low moisture-vapor transmission plastic for enhanced corrosion protection, may be modified so that it provides physical protection while not affecting the sensitivity of the sensor. FIG. 3 shows this alternative embodiment wherein a plurality of holes 54 have been made through sheath 53. The sheath may also be secured to the sensor in such a way that the top and bottom are not sealed so that the fluid level inside the sheath would be the same as that outside. Alternatively, holes could be provided near its ends for the same purpose. In this way the sensor has the necessary additional physical protection but its sensitivity is equal to that of a similar unsheathed sensor. Furthermore, such a protective sheath need not be flexible in the sense that it acts as a diaphragm so it may be made of other materials, including sheet metals or tubing.

Having now described in detail an embodiment with various alternatives of construction, it is likely that further modifications and variations will occur to those skilled in the art. In view of the numerous ways in which the invention may be embodied, it is not intended that the scope of the invention be restricted to the precise arrangements illustrated in the drawing or described in the specification.

What is claimed is:

1. An electrical sensor for detecting the instantaneous level of fluent material, said sensor being formed as a generally flat strip adapted to be disposed in said fluent material, said sensor comprising:
   an elongated electrically conductive high tensile strength base strip;
   electrical insulation means disposed around and insulating said base strip with the exception of a full length exposed portion on one side thereof;
   an electrically conductive resistance element wound around said base strip and insulated therefrom by said insulation means;
   said insulation means being adapted to maintain those segments of said resistance element adjacent said exposed portion in normally spaced relationship from said conductive base strip; and
   a composite flexible jacket including:
   an impermeable inner layer closely embracing and enclosing said conductive base strip, said insulation means and said resistance element; said inner layer being substantially impervious to the surrounding environment of said sensor and having low moisture-vapor transmission; and
   an outer skin sealed to and enclosing said impermeable inner layer, said outer skin having a smooth non-stick outer surface and being highly resistant to abrasive wear;
   said base strip, said insulation means, said resistance element and said flexible jacket being secured together throughout the length of said sensor thereby substantially preventing longitudinal motion therebetween;
   said jacket functioning as a mechanically resilient diaphragm to efficiently convert pressure applied to a segment of said sensor to a lateral force causing said resistance element in the region of said sensor segment to contact said exposed portion of said base strip, and said jacket having substantial tensile strength.

2. The fluent material level sensor recited in claim 1 wherein said jacket structure includes a conductive surface operative to conduct static charge away from said sensor and to provide an electrostatic shield for said sensor.

3. The fluent material level sensor recited in claim 1, wherein:

said impermeable layer and said outer skin are wrapped around said sensor with their edges overlapping in the same direction to thereby prevent leakage by creating a path of extended length through the seams of said composite jacket structure.

4. The fluent material level sensor recited in claim 2, wherein:

said high tensile strength member is a plastic having continuous longitudinal high tensile strength fibers imbedded therein and is no greater in width than said base strip.

5. The fluent material level sensor recited in claim 1, and further comprising:

an elongated electrically insulating facing disposed between said resistance element and said flexible jacket, said facing confronting said exposed portion of said base strip, said facing being secured to said sensor only at the ends thereof.

6. A sensor for providing an electrical signal related to the instantaneous level of fluent material, said sensor being formed as a generally flat strip adapted to be disposed in said fluent material, said sensor comprising:

an elongated electrically conductive high tensile strength base strip;

electrical insulation means disposed around and insulating said base strip with the exception of a full length exposed portion on one side thereof;

an electrically conductive resistance element wound around said base strip and insulated therefrom by said insulation means;

said insulation means being adapted to maintain those segments of said resistance element adjacent said exposed portion in normally spaced relationship from said conductive base strip;

an elongated electrically insulating facing of relatively stiff high tensile strength material disposed over said resistance element confronting said exposed portion, said facing being secured to said sensor only at the ends thereof, capable of free inward flexing, and operative to distribute point load forces which may be experienced by said sensor; and a flexible electrically insulating mechanically resilient jacket closely embracing, enclosing and sealing said conductive base strip, said insulation means, said resistance element and said insulating facing;

whereby upon application of predetermined external pressure to a segment of said sensor, said insulating jacket and said electrically insulating facing move inwardly of said sensor to cause said resistance element in the region of said segment to contact said exposed portion of said base strip;

said facing being operative to prevent inward flexing of said jacket into the spaces between adjacent turns of said resistance element and to prevent the effects of spurious buckling of the outer jacket surface.

7. The fluent material level sensor recited in claim 6, wherein:

said insulating facing is maintained in tension throughout the operative length of said sensor.

8. The fluent material level sensor recited in claim 6, wherein:

said resistance element is a flat ribbon having a rectangular cross section and a substantially uniform resistivity, said resistance element being wound around said insulation means with a uniform tension and predetermined pitch.

9. The fluent material level sensor recited in claim 7, wherein:

said insulating facing is no greater in width than said base strip.

10. The fluent material level sensor recited in claim 6, wherein:

said exposed portion of said base strip is coated with a highly electrically conductive metal.

11. The fluent material level sensor recited in claim 6, wherein:

said base strip is a laminar structure comprising a layer of high tensile strength and a metallic layer having a coating of a highly conductive metal.

12. The fluent material level sensor recited in claim 6, wherein:

said insulation means, said resistance element and said insulating jacket are secured to the side of said base strip opposite said exposed portion throughout its length to thereby prevent relative longitudinal motion therebetween.

13. The fluent material level sensor recited in claim 12, and further comprising:

means for sealing each end of said sensor and for securing the ends of said insulating facing with respect to the ends of said base strip.

14. The fluent material level sensor recited in claim 6, and further comprising:

a loose fitting, removable, tubular external sheath enclosing said sensor.

15. The fluent material level sensor recited in claim 14, wherein:

said external sheath is sealed around said sensor and is flexible and acts as a diaphragm to transmit the pressure of said material to said flexible electrically insulating jacket, said external sheath also having a low moisture-vapor transmission and a low coefficient of friction.

16. The fluent material level sensor recited in claim 14, wherein:

said external sheath is adapted to provide free communication between the enclosed sensor and its environment.

17. The fluent material level sensor recited in claim 14, wherein:

said sheath is provided with a plurality of holes through its side and at its ends.

18. An electrical sensor for detecting the instantaneous level of fluent material, said sensor being formed as a generally flat strip adapted to be disposed in said fluent material said sensor comprising:

an elongated electrically conductive high tensile strength base strip;

electrically insulative means disposed around and insulating said base strip with the exception of a full length exposed portion on one side thereof;

an electrically conductive resistance element wound around said base strip and insulated therefrom by said insulation means;

said insulation means being adapted to maintain those segments of said resistance element adjacent to said exposed portion in normally spaced relationship from said conductive base strip; and a composite flexible jacket structure including:

an impermeable inner layer closely embracing and enclosing said conductive base strip, said insulative means and said resistance element; said inner layer having the property of low moisture vapor transmission and being substantially impervious to the surrounding environment of the sensor;

a high tensile strength member adhesively secured to said inner layer; and an outer skin sealed to and enclosing said tensile strength member and said impermeable inner layer, said outer skin having a smooth non-stick outer surface and being highly resistant to abrasive wear.

19. A fluent material level sensor recited in claim 18 further including a second high tensile strength member adhesively secured to said inner layer.

20. The fluent material level sensor recited in claim 18 wherein said high tensile strength member is composed of a plastic material having longitudinally disposed glass fibers imbedded therein.

21. The fluent material level sensor recited in claim 18 wherein said base strip and said insulation means are secured together throughout the length of the sensor by an adhesive layer disposed between said base strip and said insulation means, and wherein said insulation means, said resistance element and said flexible jacket are secured together throughout the length of said sensor by a second adhesive layer disposed between said insulation means and said flexible jacket.

References Cited

UNITED STATES PATENTS

| 2,713,793 | 6/1955 | Andersen | 73—301 |
| 3,153,342 | 10/1964 | Pierce et al. | 73—301 |

FOREIGN PATENTS 716,958  10/1954  Great Britain.

S. CLEMENT SWISHER, Primary Examiner

U.S. Cl. X.R.

338—42